US009551916B2

(12) United States Patent
Magi et al.

(10) Patent No.: US 9,551,916 B2
(45) Date of Patent: Jan. 24, 2017

(54) INTEGRATED AND ADJUSTABLE IMAGE PROJECTION WITH AUTO-IMAGE CORRECTION IN ELECTRONIC DEVICES USING AN IN-FACING OR WORLD-FACING IMAGE PROJECTOR

(71) Applicant: Intel Corporation, Santa Clara, CA (US)

(72) Inventors: Aleksander Magi, Aloha, OR (US); Hormuzd M. Khosravi, Portland, OR (US); Vivek M. Paranjape, Hillsboro, OR (US); Wah Yiu Kwong, Beaverton, OR (US); Duane G. Quiet, Hillsboro, OR (US); Arunima Kashyap, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 22 days.

(21) Appl. No.: 14/496,123

(22) Filed: Sep. 25, 2014

(65) Prior Publication Data

US 2016/0091781 A1 Mar. 31, 2016

(51) Int. Cl.
*G09G 5/00* (2006.01)
*G03B 21/134* (2006.01)
(Continued)

(52) U.S. Cl.
CPC ............. *G03B 21/134* (2013.01); *G03B 17/54* (2013.01); *G03B 21/145* (2013.01); *G03B 21/30* (2013.01);
(Continued)

(58) Field of Classification Search
CPC .......... G06F 3/016; G06F 3/011; G06F 3/038; G06F 3/03333; G06F 3/03313
(Continued)

(56) References Cited

U.S. PATENT DOCUMENTS 6,525,932 B1 * 2/2003 Ohnishi ................ G06F 1/1607
235/430
2002/0021418 A1 2/2002 Raskar
(Continued)

FOREIGN PATENT DOCUMENTS

CN    1967372 A    5/2007
CN  101435980 A    5/2009
(Continued)

OTHER PUBLICATIONS

Lee, Jae Sang, "Portable LED projector (PG6/PD500 Series)", IDSA, Submitted on Jun. 20, 2013, 1 Page, available at:<http://www.idsa.org/portable-led-projector-pg6pd500-series>.
(Continued)

*Primary Examiner* — Kimnhung Nguyen
(74) *Attorney, Agent, or Firm* — Inventive Patent Law, P.C.; Jim H. Salter (57) ABSTRACT

A system and method for implementing integrated and adjustable image projection with auto-image correction in electronic devices using an in-facing or world-facing image projector are disclosed. A particular embodiment includes an electronic device including: a lid; a base including a hinge coupling the lid with the base; and an image projection subsystem including an image projector installed in the lid, the image projector being configured to produce a projected image that is projected onto a projection surface, the angle of the projection being adjustable by adjusting the angle of the lid relative to the base.

19 Claims, 8 Drawing Sheets

(51) Int. Cl.
*G03B 21/14* (2006.01)
*G03B 21/30* (2006.01)
*G06T 1/00* (2006.01)
*G06T 7/00* (2006.01)
*H04N 9/31* (2006.01)
*G03B 17/54* (2006.01)

(52) U.S. Cl.
CPC .......... *G06T 1/0007* (2013.01); *G06T 7/0022* (2013.01); *H04N 9/3194* (2013.01); *G06T 2207/10004* (2013.01)

(58) Field of Classification Search
USPC .................. 345/156–158, 169, 901–903
See application file for complete search history.

(56) References Cited

U.S. PATENT DOCUMENTS

| | | | | |
|---|---|---|---|---|
| 2006/0082518 | A1* | 4/2006 | Ram | G06F 1/1601 |
| | | | | 345/1.1 |
| 2007/0109509 | A1* | 5/2007 | Lee | G03B 21/10 |
| | | | | 353/99 |
| 2008/0094579 | A1 | 4/2008 | Fujinawa et al. | |
| 2011/0205150 | A1* | 8/2011 | Saito | G11B 21/12 |
| | | | | 345/156 |

FOREIGN PATENT DOCUMENTS

| | | |
|---|---|---|
| JP | 2010-164605 A | 7/2010 |
| KR | 2004-26797 A | 9/2006 |
| KR | 10-2008-0024302 A | 3/2008 |
| KR | 10-2010-0043853 A | 4/2010 |
| TW | 581362 U | 3/2004 |
| TW | 200731763 A | 8/2007 |
| WO | 2016/048432 A1 | 3/2016 |

OTHER PUBLICATIONS

Hoffman, Tony, "Next-Gen Projectors", Jul. 19, 2010, 2 Pages, available at: <http://www.pcmag.com/article2/0,2817,2366598,00.asp>.

International Search Report and Written Opinion received for PCT Patent Application No. PCT/US2015/039388, mailed Oct. 20, 2015, 13 pages.

Search Report and Office Action received for Taiwanese Patent Application No. 104127373, mailed on May 26, 2016, 10 pages of Taiwanese Office Action including 1 page of English Translation of Search Report.

* cited by examiner

Processing Logic for Implementing
Integrated and Adjustable Image Projection
-1100-

Provide an electronic device having a lid and a base, the base including a hinge coupling the lid with the base.
-1110-

Provide an image projection subsystem including an image projector in the lid of the electronic device, the image projector being configured to produce a projected image that is projected onto a projection surface.
-1120-

Project the projected image onto the projection surface.
-1130-

Adjust the angle of the projection by adjusting the angle of the lid relative to the base.
-1140-

End

INTEGRATED AND ADJUSTABLE IMAGE PROJECTION WITH AUTO-IMAGE CORRECTION IN ELECTRONIC DEVICES USING AN IN-FACING OR WORLD-FACING IMAGE PROJECTOR

TECHNICAL FIELD

This patent application relates to electronic systems, mobile devices, and computer-implemented software, according to various example embodiments, and more specifically to a system and method for implementing integrated and adjustable image projection with auto-image correction in electronic devices using an in-facing or world-facing image projector.

BACKGROUND

Consumers frequently store many types of data on electronic devices, such as cellular telephones, portable media players, laptop computers, and personal data assistants. For example, consumers may store photographs, movies, presentations, messages, documents, databases, and spreadsheets on electronic devices. Due to the increasing portability of electronic devices, consumers frequently share data stored on electronic devices with other people. Many electronic devices include display screens that allow a consumer to display the data and allow viewing of the data by other people. However, to facilitate portability, these display screens may be small, which may inhibit viewing by larger groups of people. Further, to facilitate viewing on the display screen, the electronic device may be transferred between viewers, which may be inconvenient.

Electronic devices, such as mobile computing platforms, portable devices, all-in-one desktop devices, laptop computers, handheld computers, touch screen systems, and other electronic devices typically include a base with keys and a cover or lid rotationally coupled to the base. These devices are designed for portability and convenience wherein the lid serves both as protection and as a functional portion of the device. The lid often includes a liquid crystal display (LCD) or plasma display which is functionally connected to the electronic device's data processor and memory to display information. The lid may be pivoted from a closed position in which it is folded against the base for storage or transport and to an open position for operation. In the open position, the lid is pivoted to a position so that the user can effectively see and use the screen. In some cases, using the screen can include enabling the user to effect user input by touching the screen or touchscreen on the lid. The position of the screen will depend on factors such as, the height of the user, position of the user in relation to the device, lighting conditions, and the like.

Personal computing solutions, including but not limited to, laptops, ultrabooks, 2-in-1 detachable laptops, all-in-one computing systems, convertibles, and tablets allow the user to engage with digital content on the fixed display screen; but, these systems limit the user to only interacting with content on the fixed display screen in a particular size and format. Several problems can occur with a fixed screen size and format. These problems can include, but are not limited to: the fixed screen is non-customizable (e.g., in size, angle, and distance); the fixed screen is a non-immersive experience and does not enable information sharing with others; and current projection solutions are limited in their adjustment capabilities and are typically implemented as a separate device that is entirely independent of the personal computing system.

BRIEF DESCRIPTION OF THE DRAWINGS

The various embodiments are illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

In the various embodiments described herein, a system and method for implementing integrated and adjustable image projection with auto-image correction in electronic devices using an in-facing or world-facing image projector are disclosed.

The various embodiments described herein provide an integrated projection solution in an electronic device that uses an image projector integrated with an outwardly-facing or world-facing camera (image capture means) in a lid of the electronic device for projecting an image generated or obtained by the electronic device onto a projection surface. In the various embodiments described herein, the electronic device can include mobile computing or communication devices, two-in-one or all-in-one desktop devices, laptop computers, ultrabook computers, detachables, handheld computers, wearable computers, a wearable computing platform, touch screen systems, tablet computing systems, Personal Digital Assistants (PDAs), cellular telephones, smartphones, web appliances, and other electronic devices typically including a base with keys and a cover or lid rotationally coupled to the base with a lid hinge. Alternative embodiments provide an integrated projection solution that uses an image projector integrated with an inwardly-facing or user-facing camera in the lid of the electronic device for projecting an image generated or obtained by the electronic device onto a projection surface. The various embodiments also allow the user to adjust the angle of the projection using the lid hinge provided in the electronic device. The world-facing projector embodiment allows the user of the electronic device to project image content outwardly from their electronic device onto forward facing walls, surfaces, tables, temporary walls, screens, ceilings, and other projection surfaces. The in-facing projector embodiment allows the user of the electronic device to project image content outwardly from their electronic device onto walls, surfaces, tables, temporary walls, screens, ceilings, and other projection surfaces.

The various embodiments described herein also integrate auto-focusing, auto-keystoning, auto-color adjustment, and an auto-surfacing solution implemented through digital correction by an image processor coupled to the image projector and the camera of the electronic device. An alternative embodiment can use the standard processor in the electronic device to perform the digital correction of the projected image. Keystone correction, also called keystoning, is a well-known function that allows multimedia projectors that are not placed perpendicularly to the horizontal centerline of the screen (e.g., too high or too low) to skew the output image, thereby making the image appear rectangular. Keystone correction provides the ability to intentionally "distort" the output image to recreate the original rectangular image provided by the image source, thus eliminating the skewed output that would otherwise result due to angled projection. In the various embodiments described herein, the image projected by the image projector of the electronic device can be captured by the camera of the electronic device in a feedback system. The feedback system can be used to auto-focus, auto-keystone, auto-color adjust, and auto-surface the projection using an image processor or the standard data processor of the electronic device. The feedback system can be used analyze the projected image and manipulate the lens control of the image projector to focus the projected image. In addition, the feedback system can be used to perform digital correction of the projected image so the projected image is visually correct for the environment in which the image is being projected.

FIGS. 1 through 4 illustrate example embodiments of a system for implementing integrated and adjustable image projection with auto-image correction in an electronic device using a world-facing image projector in a lid of the electronic device. FIGS. 5 through 8 illustrate example embodiments of a system for implementing integrated and adjustable image projection with auto-image correction in an electronic device using an in-facing image projector in a lid of the electronic device. These embodiments are described in more detail below.

Figure 1:
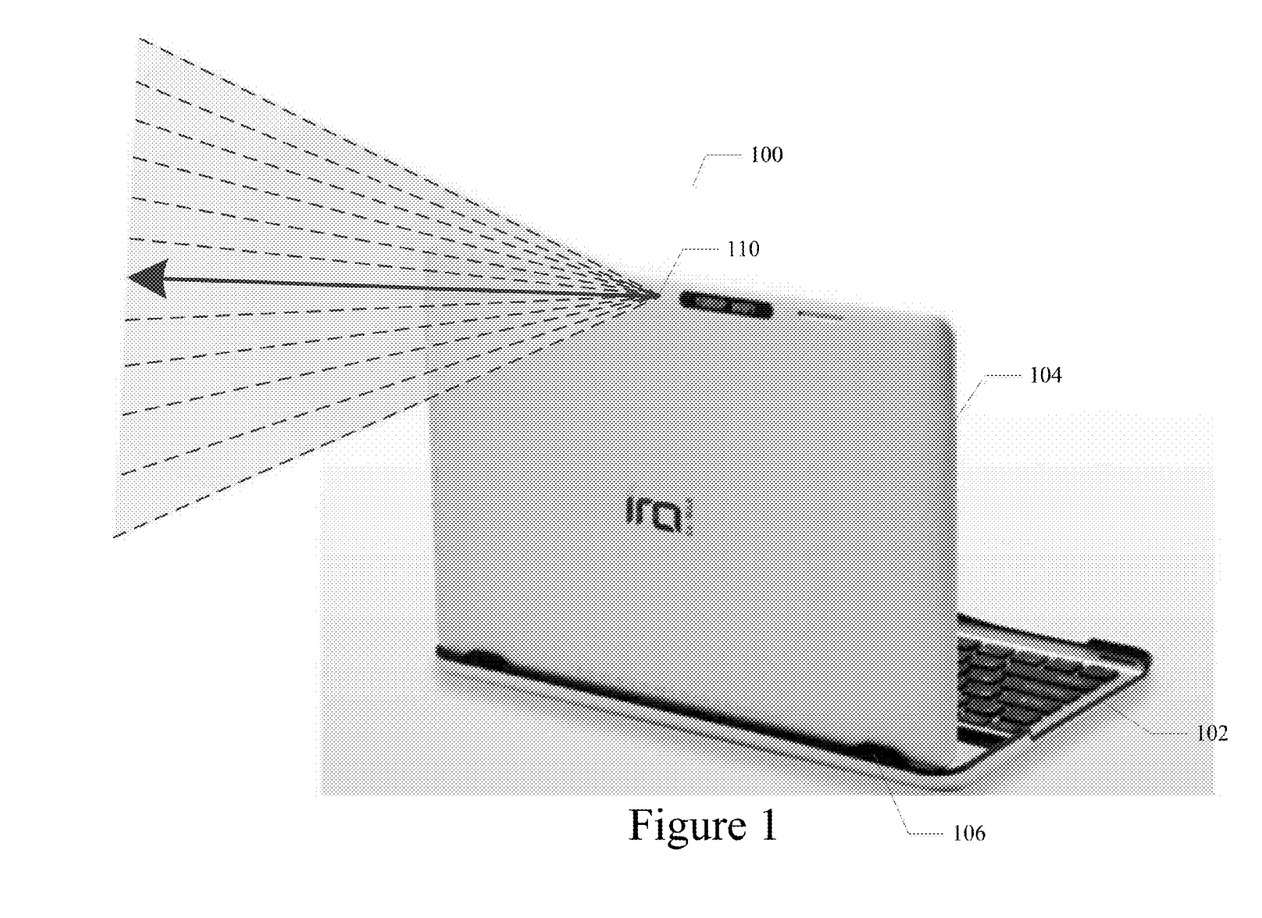
FIGS. 1 through 4 illustrate example embodiments of a system for implementing integrated and adjustable image projection with auto-image correction in an electronic device using a world-facing image projector in a lid of the electronic device.
Figures 2, 3, 4:
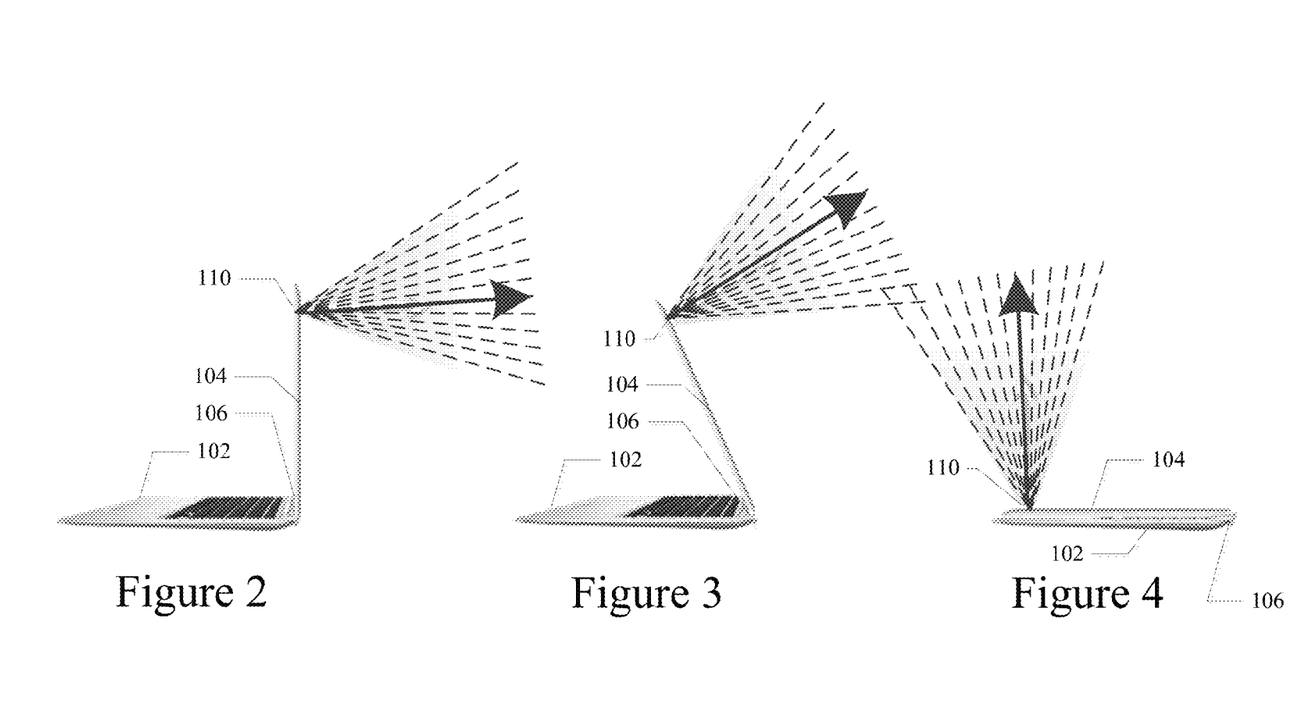

Referring now to FIG. 1, an example embodiment 100 described herein is configured to provide integrated and adjustable image projection with auto-image correction in an electronic device 100 using a world-facing image projector in a lid of the electronic device. As shown in FIG. 1, the example embodiment 100 includes an electronic device with a base portion 102 and a lid portion 104. The base portion 102 and lid portion 104 are rotatably coupled via a lid hinge 106, which can be rotated in either direction around an axis of rotation as shown in FIGS. 1 through 8. The example embodiment 100 shown in FIG. 1 also includes an image projection subsystem 110 installed in the lid 104 of the electronic device. The image projection subsystem 110 of an example embodiment can include an image projector 112, a camera 114, and an image processor 116 (shown in FIG. 10 and described below). As shown in FIG. 1, images can be generated or obtained by the electronic device 100 and projected outwardly (in a world-facing direction) from the lid 104 using the image projector 112 of image projection subsystem 110 of an example embodiment. The projected images can be any form of photographic, graphic, text, video, animation, or any form of information display. By applying force to the lid 104, the angle of the image projection can be adjusted as the lid is rotated via lid hinge 106. As a result, the angle of the lid 104 relative to the base 102 can be adjusted and thus the angle of the image projection can be similarly adjusted. FIGS. 2 through 4 illustrate how the angle of the image projection of image projection subsystem 110 can be adjusted by rotating the lid 104 of electronic device 100 about the lid hinge 106. As shown in the example of FIG. 2, the lid 104 has been rotated to about a 90° angle relative to the base 102. In this configuration, the image projection has been adjusted to a roughly horizontal direction. As shown in the example of FIG. 3, the lid 104 has been rotated to about a 45° angle relative to the base 102. In this configuration, the image projection has been adjusted to a roughly 45° angle upward direction. As shown in the example of FIG. 4, the lid 104 has been rotated to about a 0° angle relative to the base 102. In this configuration, the image projection has been adjusted to a roughly vertical direction. It will be apparent to those of ordinary skill in the art in view of the disclosure herein that the image projection of image projection subsystem 110 can be adjusted in various ways by rotating the lid 104 of electronic device 100 about the lid hinge 106.

Figure 5:
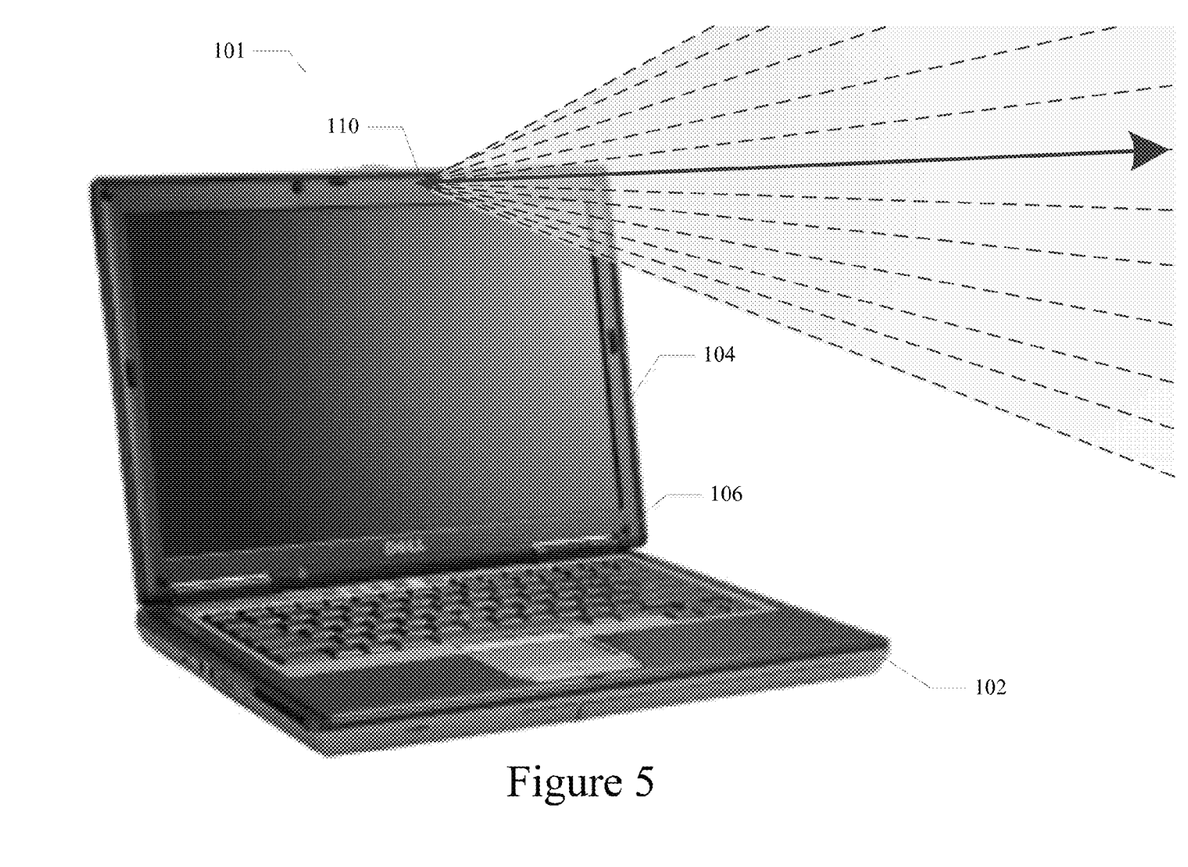
FIGS. 5 through 8 illustrate example embodiments of a system for implementing integrated and adjustable image projection with auto-image correction in an electronic device using an in-facing image projector in a lid of the electronic device.
Figure 6:
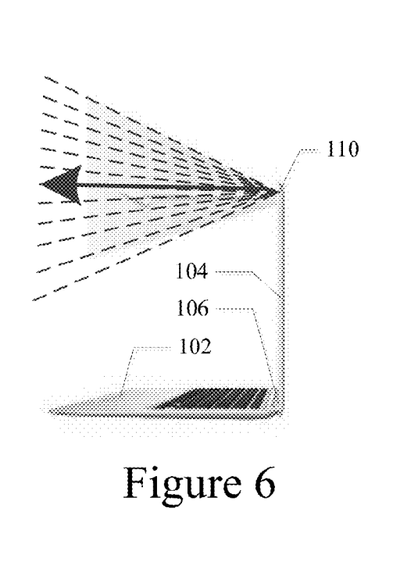
Figure 7:
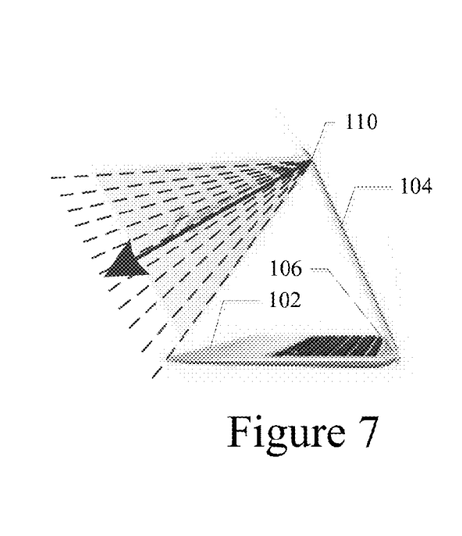
Figure 8:
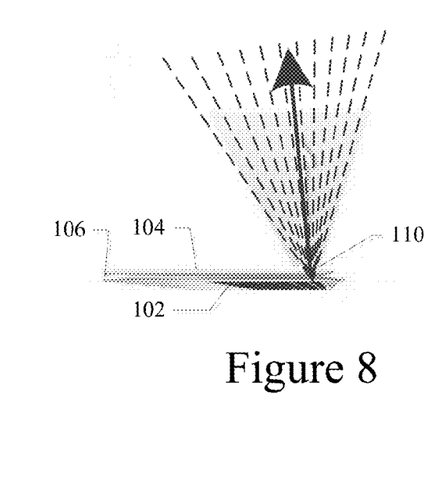

Referring now to FIG. 5, an example embodiment 101 described herein is configured to provide integrated and adjustable image projection with auto-image correction in an electronic device 100 using an in-facing or user-facing image projector in a lid of the electronic device. As shown in FIG. 5, the example embodiment 101 includes an electronic device with a base portion 102 and a lid portion 104. The base portion 102 and lid portion 104 are rotatably coupled via a lid hinge 106, which can be rotated in either direction around an axis of rotation as shown in FIGS. 1 through 8. The example embodiment 101 shown in FIG. 5 also includes an image projection subsystem 110 installed in the lid 104 of the electronic device. The image projection subsystem 110 of an example embodiment can include an image projector 112, a camera 114, and an image processor 116 (shown in FIG. 10 and described below). As shown in FIG. 5, images can be generated or obtained by the electronic device 100 and projected outwardly (in an in-facing or user-facing direction) from the lid 104 using the image projector 112 of image projection subsystem 110 of an example embodiment. By applying force to the lid 104, the angle of the image projection can be adjusted as the lid is rotated via lid hinge 106. As a result, the angle of the lid 104 relative to the base 102 can be adjusted and thus the angle of the image projection can be similarly adjusted. FIGS. 6 through 8 illustrate how the angle of the image projection of image projection subsystem 110 can be adjusted by rotating the lid 104 of electronic device 100 about the lid hinge 106. As shown in the example of FIG. 6, the lid 104 has been rotated to about a 90° angle relative to the base 102. In this configuration, the image projection has been adjusted to a roughly horizontal direction. As shown in the example of FIG. 7, the lid 104 has been rotated to about a 45° angle relative to the base 102. In this configuration, the image projection has been adjusted to a roughly 45° angle downward direction. As shown in the example of FIG. 8, the lid 104 has been rotated to about a 360° angle relative to the base 102. In this configuration, the image projection has been adjusted to a roughly vertical direction. It will be apparent to those of ordinary skill in the art in view of the disclosure herein that the image projection of image projection subsystem 110 can be adjusted in various ways by rotating the lid 104 of electronic device 100 about the lid hinge 106.

Figure 9:
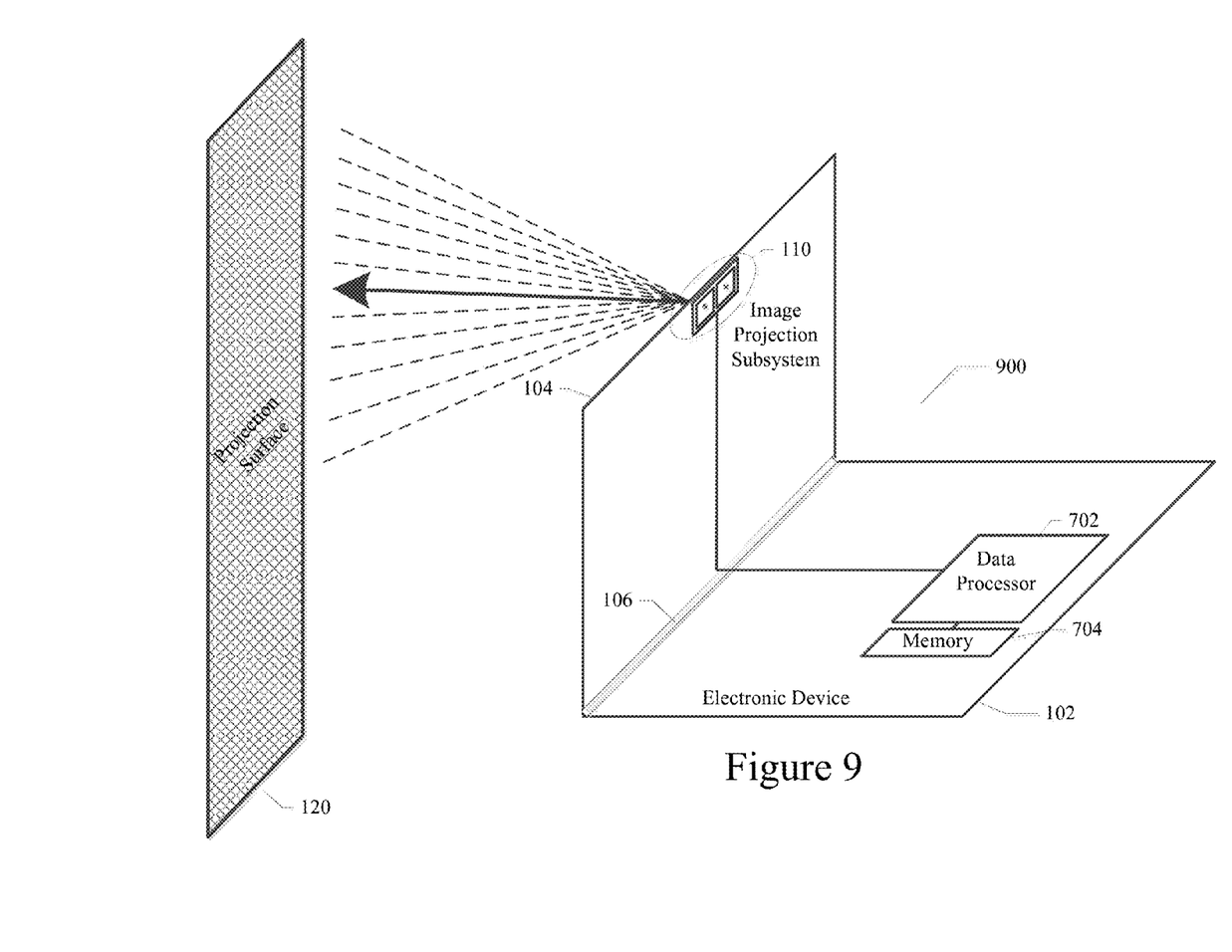
FIGS. 9 and 10 illustrate the details of the image projection subsystem of an example embodiment.
Figure 10:
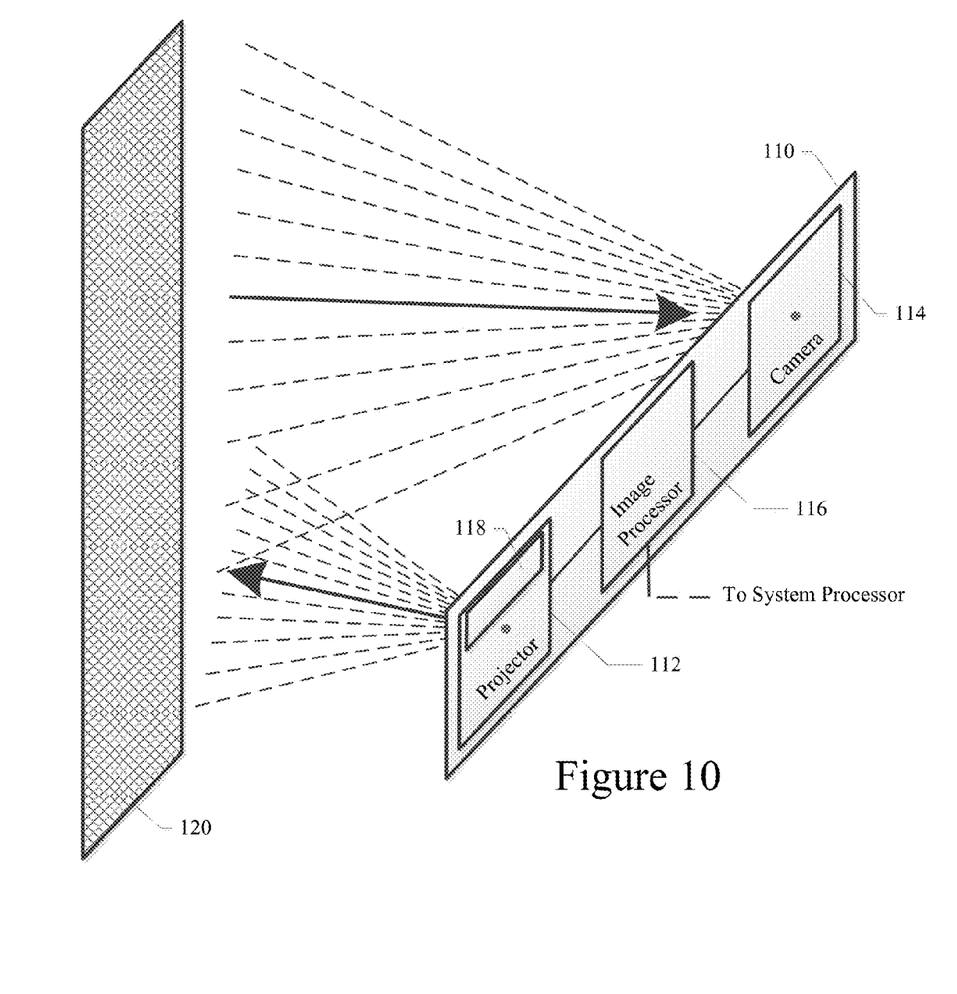

Referring now to FIGS. 9 and 10, the details of the image projection subsystem 110 of an example embodiment are described. As shown in the example of FIG. 9, an image projection subsystem 110 integrating an outwardly-facing or world-facing image projector and camera in a lid 104 of an electronic device 900 can be used for projecting an image generated or obtained by the electronic device 900 onto a projection surface 120. As described above, the projection surface 120 can be a wall, surface, table, temporary wall, screen, ceiling, or any other projection surface. The image projection subsystem 110 can be in data communication with a standard data processor 702 in the base 102 of the electronic device 900. Additionally, power elements, specialized image processing elements, thermal control elements, and/or the like can be included in the base 102 and in data communication or electrical or thermal connection with image projection subsystem 110. Standard conductive traces or fiber optic lines can be used to effect the data communication between the image projection subsystem 110 and elements in the base 102. The data processor 702 can process images stored in memory 704 and transfer the images to the image projection subsystem 110 for projection display. In a particular embodiment as shown in FIG. 10, the image projection subsystem 110 can include an image processor 116, which can perform additional image processing prior to projection and control the transfer and marshaling of the images from the data processor 702. As described above, the lid 104 can be rotated around lid hinge 106 to adjust the position and angle of the image projection on the projection surface 120.

Referring now to FIG. 10, the details of the image projection subsystem 110 of an example embodiment are further described. In an example embodiment shown in FIG. 10, the image projection subsystem 110 can include an image projector 112, a camera 114, and an image processor 116. Image projection devices and cameras are well known to those of ordinary skill in the art. As shown in the example of FIG. 10, an image projection subsystem 110 can use the image projector 112 to project an image onto a projection surface 120. Concurrently, the camera 114 of image projection subsystem 110 can capture an image displayed on the projection surface 120. In this manner, the camera 114 can capture all or a portion of the image projected onto the projection surface 120 by the image projector 112. The image captured by the camera 114 can be transferred to image processor 116 for processing. Alternatively, the captured image can be transferred to data processor 702 for processing. Using well-known image processing techniques, the image processor 116 and/or the data processor 702 can analyze the captured image using a variety of processes or operations. For example, the captured image can be analyzed to detect out-of-focus characteristics. As a result of the out-of-focus analysis and detection, the image processor 116 can issue a control command to a focus adjustment module 118 of the image projector 112. The focus adjustment module 118 can be commanded to correct the focus of the projected image based on the analysis of the captured image. The camera 114 can capture all or a portion of a subsequently projected image from the projection surface 120 to determine if the focus of the projected image has been corrected. Thus, the image capture from camera 114 serves as a feedback loop to provide information to enable the image projection subsystem 110 to automatically focus (auto-focus) the image projected by the image projector 112.

In an alternative embodiment, the image processor 116 and/or the data processor 702 can dynamically modify the image being displayed by the image projector 112 to correct for the detection of the out-of-focus characteristics. In this alternative embodiment, the focus adjustment module 118 would not need to be commanded to correct the focus of the projected image. This alternative embodiment is also beneficial if the image projector 112 does not have a focus adjustment module 118. The image processor 116 can dynamically modify and re-focus the image being displayed by the image projector 112 using well-known techniques.

In a similar manner, the image processor 116 and/or the data processor 702 can dynamically modify the image being displayed by the image projector 112 to correct for the detection of a variety of image characteristics. For example, the image processor 116 and/or the data processor 702 can dynamically perform auto-keystoning, auto-color adjustment, and auto-surfacing of the projected image based on analysis of an image captured by camera 114. Thus, the image capture from camera 114 serves as a feedback loop or feedback system to provide information to enable the image projection subsystem 110 to automatically perform a variety of modifications and/or corrections of the image projected by the image projector 112. In this manner, the image projection subsystem 110 can automatically correct for a variety of image projection anomalies, such as out-of-focus projection, off-center projection, tilted projection, non-optimal lighting, non-optimal projection surfaces, and the like.

Thus, the embodiments described herein provide a technical solution to a technical problem. The various embodiments improve the functioning of the electronic device by providing integrated and adjustable image projection with auto-image correction in the electronic device. The various embodiments also serve to transform the projected images to a different and improved state by virtue of the variety of modifications and/or corrections applied to the images projected by the image projector. Additionally, the various embodiments effect an improvement in a variety of technical fields including the fields of image projection, mobile computing, information sharing, and mobile communications. Particular embodiments can be used with wearable electronic devices or wearables, such as an electronic watch or Google® Glass, for example. A separate optic element connected via fiber can be used for the image projection.

Figure 11:
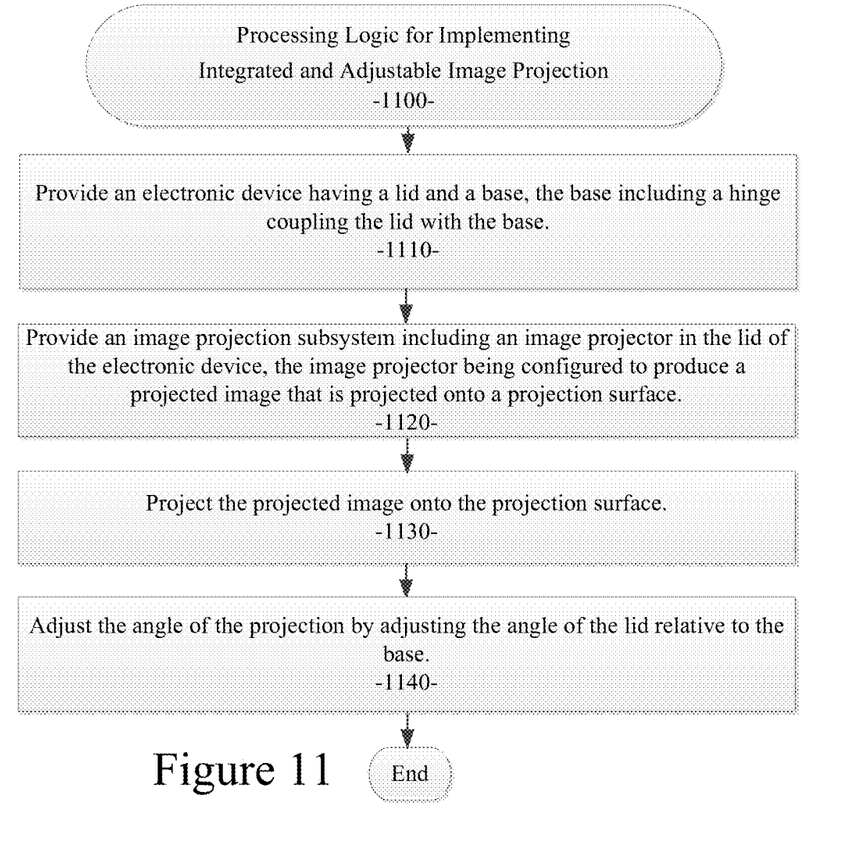
FIG. 11 is a processing flow chart illustrating an example embodiment of a method as described herein.

Referring now to FIG. 11, a processing flow diagram illustrates an example embodiment of a method 1100 for a method as described herein. The method 1100 of an example embodiment includes: providing an electronic device having a lid and a base, the base including a hinge coupling the lid with the base (processing block 1110); providing an image projection subsystem including an image projector in the lid of the electronic device, the image projector being configured to produce a projected image that is projected onto a projection surface (processing block 1120); projecting the projected image onto the projection surface (processing block 1130); and adjusting the angle of the projection by adjusting the angle of the lid relative to the base (processing block 1140).

The various embodiments as described herein can provide several advantages over conventional image projection systems. Firstly, the described integrated projection solution is provides a fully customizable screen size and content. The screen size and content is fully customizable in size, angle, and distance. As a result, the projected content provides a more immersive experience in the surrounding environment. The described integrated projection solution also provides the ability to adjust the position of the projected image by adjusting the lid of an electronic device. Additionally, the described embodiments can use the integrated world-facing or in-facing camera mount that exists in electronic device form factors today, and does not require the user to buy a separate, redundant product.

Figure 12:
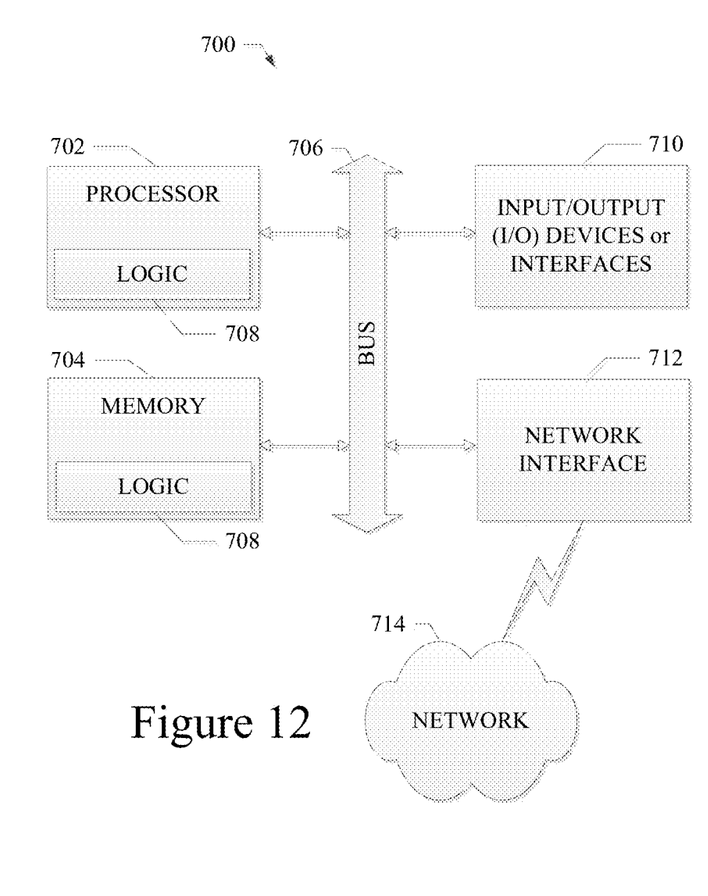
FIG. 12 shows a diagrammatic representation of a machine in the example form of a mobile computing and/or communication system within which a set of instructions when executed and/or processing logic when activated may cause the machine to perform any one or more of the methodologies described and/or claimed herein.

FIG. 12 shows a diagrammatic representation of a machine in the example form of a mobile computing and/or communication system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example mobile computing and/or communication system 700 includes a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth, IEEE 802.11x, and the like. In essence, network interface 712 may include or support virtually any wired and/or wireless communication mechanisms by which information may travel between the mobile computing and/or communication system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700.

As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

In various embodiments as described herein, example embodiments include at least the following examples.

An electronic device comprising: a lid; a base including a hinge coupling the lid with the base; and an image projection subsystem including an image projector installed in the lid, the image projector being configured to produce a projected image that is projected onto a projection surface, the angle of the projection being adjustable by adjusting the angle of the lid relative to the base.

The electronic device as claimed above wherein the image projection subsystem is configured to project the projected image in an outwardly-facing or world-facing direction.

The electronic device as claimed above wherein the image projection subsystem is configured to project the projected image in an inwardly-facing or user-facing direction.

The electronic device as claimed above wherein the image projection subsystem further including a camera to capture at least a portion of the projected image.

The electronic device as claimed above further including a processor to analyze the captured image and to cause correction of the projected image based on the analysis of the captured image.

The electronic device as claimed above wherein the processor is an image processor of the image projection subsystem.

The electronic device as claimed above wherein the processor is a standard data processor of the electronic device.

The electronic device as claimed above wherein the correction of the projected image includes controlling a lens element of the image projector to adjust the focus of the projected image.

The electronic device as claimed above wherein the correction of the projected image includes modifying the image projected by the image projector by performing at least one of the operations from the group consisting of: auto-focusing, auto-keystoning, auto-color adjustment, and auto-surfacing.

The electronic device as claimed above wherein the electronic device is of a type from the group consisting of: a mobile computing device, a mobile communication device, a two-in-one desktop device, an all-in-one desktop device, a laptop computer, an ultrabook computer, a detachable computing device, a handheld computer, a wearable computing platform, a touch screen system, a tablet computing system, a Personal Digital Assistant (PDA), a cellular telephone, a smartphone, and a web appliance.

An image projection subsystem comprising: an image projector configured to produce a projected image that is projected onto a projection surface; a camera to capture at least a portion of the projected image; and a processor to analyze the captured image and to cause correction of the projected image based on the analysis of the captured image.

The image projection subsystem as claimed above wherein the image projection subsystem is configured to project the projected image in an outwardly-facing or world-facing direction.

The image projection subsystem as claimed above wherein the image projection subsystem is configured to project the projected image in an inwardly-facing or user-facing direction.

The image projection subsystem as claimed above wherein the correction of the projected image includes controlling a lens element of an image projector to adjust the focus of the projected image.

The image projection subsystem as claimed above wherein the correction of the projected image includes modifying the projected image by performing at least one of the operations from the group consisting of: auto-focusing, auto-keystoning, auto-color adjustment, and auto-surfacing.

The image projection subsystem as claimed above wherein the processor is an image processor of the image projection subsystem.

The image projection subsystem as claimed above wherein the processor is a standard data processor of an electronic device.

The image projection subsystem as claimed above wherein the image projection subsystem is included in an electronic device of a type from the group consisting of: a mobile computing device, a mobile communication device, a two-in-one desktop device, an all-in-one desktop device, a laptop computer, an ultrabook computer, a detachable computing device, a handheld computer, a wearable computing platform, a touch screen system, a tablet computing system, a Personal Digital Assistant (PDA), a cellular telephone, a smartphone, and a web appliance.

A method comprising: providing an electronic device having a lid and a base, the base including a hinge coupling the lid with the base; providing an image projection subsystem including an image projector in the lid of the electronic device, the image projector being configured to produce a projected image that is projected onto a projection surface; projecting the projected image onto the projection surface; and adjusting the angle of the projection by adjusting the angle of the lid relative to the base.

The method as claimed above including projecting the projected image in an outwardly-facing or world-facing direction.

The method as claimed above including projecting the projected image in an inwardly-facing or user-facing direction.

The method as claimed above further including capturing at least a portion of the projected image, analyzing the captured image, and causing correction of the projected image based on the analysis of the captured image.

The method as claimed above wherein the correction of the projected image includes controlling a lens element of the image projector to adjust the focus of the projected image.

The method as claimed above wherein the correction of the projected image includes modifying the projected image by performing at least one of the operations from the group consisting of: auto-focusing, auto-keystoning, auto-color adjustment, and auto-surfacing.

The method as claimed above wherein the method is performed in an electronic device of a type from the group consisting of: a mobile computing device, a mobile communication device, a two-in-one desktop device, an all-in-one desktop device, a laptop computer, an ultrabook computer, a detachable computing device, a handheld computer, a wearable computing platform, a touch screen system, a tablet computing system, a Personal Digital Assistant (PDA), a cellular telephone, a smartphone, and a web appliance.

An apparatus comprising: a lid means; a base means including a hinging means coupling the lid means with the base means; and an image projection means installed in the lid means, the image projection means being configured to produce a projected image that is projected onto a projection surface, the angle of the projection being adjustable by adjusting the angle of the lid means relative to the base means.

The apparatus as claimed above wherein the image projection means is configured to project the projected image in an outwardly-facing or world-facing direction.

The apparatus as claimed above wherein the image projection means is configured to project the projected image in an inwardly-facing or user-facing direction.

The apparatus as claimed above wherein the image projection means further including an image capture means to capture at least a portion of the projected image.

The apparatus as claimed above further including a processing means to analyze the captured image and to cause correction of the projected image based on the analysis of the captured image.

The apparatus as claimed above wherein the processing means is an image processor of the image projection means.

The apparatus as claimed above wherein the processing means is a standard data processor of an electronic device.

The apparatus as claimed above wherein the correction of the projected image includes controlling a lens element of the image projection means to adjust the focus of the projected image.

The apparatus as claimed above wherein the correction of the projected image includes modifying the image projected by the image projection means by performing at least one of the operations from the group consisting of: auto-focusing, auto-keystoning, auto-color adjustment, and auto-surfacing.

The apparatus as claimed above wherein the apparatus is included in an electronic device of a type from the group consisting of: a mobile computing device, a mobile communication device, a two-in-one desktop device, an all-in-one desktop device, a laptop computer, an ultrabook computer, a detachable computing device, a handheld computer, a wearable computing platform, a touch screen system, a tablet computing system, a Personal Digital Assistant (PDA), a cellular telephone, a smartphone, and a web appliance.

A non-transitory machine-useable storage medium embodying instructions which, when executed by a machine, cause the machine to: produce a projected image that is projected onto a projection surface; capture at least a portion of the projected image; and analyze the captured image and to cause correction of the projected image based on the analysis of the captured image.

The machine-useable storage medium as claimed above being further configured to project the projected image in an outwardly-facing or world-facing direction.

The machine-useable storage medium as claimed above being further configured to project the projected image in an inwardly-facing or user-facing direction.

The machine-useable storage medium as claimed above being further configured to capture at least a portion of the projected image, analyze the captured image, and cause correction of the projected image based on the analysis of the captured image.

The machine-useable storage medium as claimed above wherein the correction of the projected image includes controlling a lens element of the image projector to adjust the focus of the projected image.

The machine-useable storage medium as claimed above wherein the correction of the projected image includes modifying the projected image by performing at least one of the operations from the group consisting of: auto-focusing, auto-keystoning, auto-color adjustment, and auto-surfacing.

The machine-useable storage medium as claimed above wherein the instructions are configured to operate in an electronic device of a type from the group consisting of: a mobile computing device, a mobile communication device, a two-in-one desktop device, an all-in-one desktop device, a laptop computer, an ultrabook computer, a detachable computing device, a handheld computer, a wearable computing platform, a touch screen system, a tablet computing system, a Personal Digital Assistant (PDA), a cellular telephone, a smartphone, and a web appliance.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An electronic device comprising:
   a processor;
   a lid;
   a base including a hinge coupling the lid with the base; and
   an image projection subsystem in data communication with the processor, the image projection subsystem including an image projector installed in the lid, the image projector displaying an image on a projection surface separate from the electronic device, the angle of the displayed image being adjustable by adjusting the angle of the lid relative to the base, the image projection subsystem further including an image capture device to capture at least a portion of the displayed image produced by the image projector, the image projection subsystem being further configured to analyze the captured image and to cause correction of the displayed image based on the analysis of the captured image, the correction being caused by the processor issuing a control command to cause a focus adjustment module of the image projection subsystem to modify a lens element of the image projector to adjust the focus of the displayed image produced by the image projector.

2. The electronic device of claim 1 wherein the image projection subsystem is configured to display the displayed image in an outwardly-facing or world-facing direction.

3. The electronic device of claim 1 wherein the image projection subsystem is configured to display the displayed image in an inwardly-facing or user-facing direction.

4. The electronic device of claim 1 wherein the image capture device is a camera.

5. The electronic device of claim 1 wherein the processor is an image processor of the image projection subsystem.

6. The electronic device of claim 1 wherein the processor is a standard data processor of the electronic device.

7. The electronic device of claim 1 wherein the correction of the displayed image includes performing digital correction of the displayed image so the displayed image is visually correct for an environment in which the image is being displayed.

8. The electronic device of claim 1 wherein the correction of the displayed image includes modifying the displayed image displayed by the image projector by performing at least one of the operations from the group consisting of: auto-focusing, auto-keystoning, auto-color adjustment, and auto-surfacing.

9. The electronic device of claim 1 wherein the electronic device is of a type from the group consisting of: a mobile computing device, a mobile communication device, a two-in-one desktop device, an all-in-one desktop device, a laptop computer, an ultrabook computer, a detachable computing device, a handheld computer, a wearable computing platform, a touch screen system, a tablet computing system, a Personal Digital Assistant (PDA), a cellular telephone, a smartphone, and a web appliance.

10. An image projection subsystem comprising:
    a processor;
    an image projector producing a displayed image that is displayed on a projection surface separate from the image projection subsystem;
    a camera to capture at least a portion of the displayed image produced by the image projector;
    a focus adjustment module in data communication with the processor; and
    the processor to analyze the captured image and to cause correction of the displayed image based on the analysis of the captured image, the correction being caused by the processor issuing a control command to cause the focus adjustment module to modify a lens element of the image projector to adjust the focus of the displayed image produced by the image projector.

11. The image projection subsystem of claim 10 wherein the image projection subsystem is configured to display the displayed image in an outwardly-facing or world-facing direction.

12. The image projection subsystem of claim 10 wherein the image projection subsystem is configured to display the displayed image in an inwardly-facing or user-facing direction.

13. The image projection subsystem of claim 10 wherein the correction of the displayed image includes performing digital correction of the displayed image so the displayed image is visually correct for an environment in which the image is being displayed.

14. The image projection subsystem of claim 10 wherein the correction of the displayed image includes modifying the displayed image displayed by the image projector by performing at least one of the operations from the group consisting of: auto-focusing, auto-keystoning, auto-color adjustment, and auto-surfacing.

15. A method comprising:
   providing an electronic device having a processor, a lid and a base, the base including a hinge coupling the lid with the base;
   providing an image projection subsystem in data communication with the processor, the image projection subsystem including an image projector in the lid of the electronic device;
   displaying a displayed image onto a projection surface separate from the electronic device by use of the image projector;
   adjusting the angle of the displayed image by adjusting the angle of the lid relative to the base;
   capturing, by use of a camera of the electronic device, at least a portion of the displayed image produced by the image projector; and
   analyzing the captured image and correcting the displayed image based on the analysis of the captured image, the correction being caused by the processor issuing a control command to cause a focus adjustment module of the image projection subsystem to modify a lens element of the image projector to adjust the focus of the displayed image produced by the image projector.

16. The method as claimed in claim 15 further including performing digital correction of the displayed image so the displayed image is visually correct for an environment in which the image is being displayed.

17. The method of claim 15 wherein the correction of the displayed image includes modifying the displayed image displayed by the image projector by performing at least one of the operations from the group consisting of: auto-focusing, auto-keystoning, auto-color adjustment, and auto-surfacing.

18. An apparatus comprising:
   a processing means;
   a lid means;
   a base means including a hinging means coupling the lid means with the base means; and
   an image projection means in data communication with the processing means, the image projection means installed in the lid means, the image projection means displaying an image on a projection surface separate from the apparatus, the angle of the displayed image being adjustable by adjusting the angle of the lid means relative to the base means, the image projection means further including an image capturing means to capture at least a portion of the displayed image produced by the image projection means, the image projection means being further configured to analyze the captured image and to cause correction of the displayed image based on the analysis of the captured image, the correction being caused by the processing means issuing a control command to cause a focus adjustment means of the image projection means to modify a lens element of the image projection means to adjust the focus of the displayed image produced by the image projection means.

19. The apparatus of claim 18 wherein the image projection means being further configured to perform digital correction of the displayed image so the displayed image is visually correct for an environment in which the image is being displayed.

\* \* \* \* \*

UNITED STATES PATENT AND TRADEMARK OFFICE
CERTIFICATE OF CORRECTION

PATENT NO.        : 9,551,916 B2
APPLICATION NO.   : 14/496123
DATED             : January 24, 2017
INVENTOR(S)       : Aleksander Magi et al.

Page 1 of 1

It is certified that error appears in the above-identified patent and that said Letters Patent is hereby corrected as shown below:

In the Claims

In Column 13, Line 5, in Claim 15, delete "lid" and insert -- lid, --, therefor.

Signed and Sealed this
Twenty-third Day of May, 2017

Michelle K. Lee
*Director of the United States Patent and Trademark Office*